UNITED STATES PATENT OFFICE.

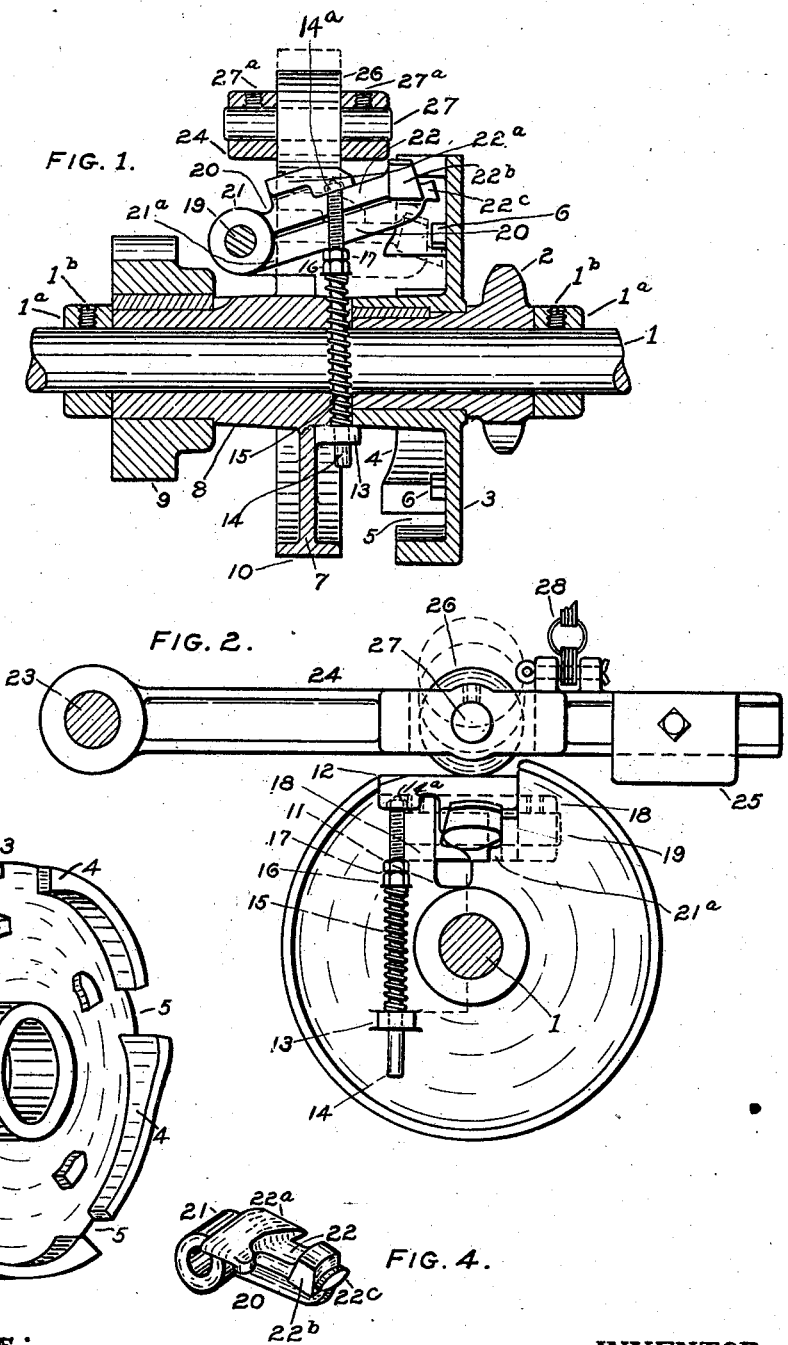

ROBERT F. WHITNEY, OF WINCHESTER, MASSACHUSETTS, ASSIGNOR OF ONE-HALF TO ARTHUR E. WHITNEY, OF WINCHESTER, MASSACHUSETTS.

MECHANICAL CLUTCH.

No. 860,002. Specification of Letters Patent. Patented July 16, 1907.

Application filed July 22, 1905. Serial No. 270,757.

*To all whom it may concern:*

Be it known that I, ROBERT F. WHITNEY, a citizen of the United States, and a resident of Winchester, in the county of Middlesex and State of Massachusetts, have invented certain new and useful Improvements in Mechanical Clutches, of which the following is a specification.

My invention relates to mechanical clutches, and its object is to provide a clutch of simple construction, easily and effectively operated.

It is illustrated by the accompanying drawings, in which:

Figure 1 is a vertical central section of the mechanism, partly in elevation. Fig. 2 is a plan view of the driven clutch member with means for operating the clutch. Fig. 3 is a perspective view of the driving clutch member. Fig. 4 is a perspective view of the dog.

Similar characters refer to similar parts throughout the several drawings.

On the stud 1 is revolubly mounted the driving gear (sprocket) 2, to which is fixed the driving clutch member 3 which is in the form of a crown wheel with broad cogs 4 and narrow spaces 5 between the cogs and which is furnished with the guiding lugs 6. On said stud 1 is also revolubly mounted the hub 8 to which is fixed the driven clutch member 7 and the gear 9. These parts are confined on stud 1 by collars 1$^a$ and set screws 1$^b$.

The driven clutch member 7 comprises a disk with an annular flange 10, the disk and flange each having a portion 11, 12 cut away, and said disk being furnished on its inner face with a perforated lug 13 through and in sliding contact with which extends the rod 14 and on which rests the inner end of the spring 15 whose outer end rests against the nut 16 adjustably screwed upon said rod and held in place by the jam nut 17. The outer end of the rod 14 engages a socket 14$^a$ in the dog 20.

Near the outer edge of the disk are the perforated lugs 18 in which is fixed the axial shaft 19 on which is revolubly mounted the dog 20 with its hub 21 and arm 22, said arm being shaped substantially as shown, with its inner end 22$^a$ adapted to fit loosely in the cut out portion 12 of the flange 10, with its outer end 22$^b$ in the form of a tooth adapted to enter and engage the slots 5 in the driving member 3 and with its extreme outer end 22$^c$ reduced and adapted to pass inside and engage the guiding lugs 6 on the driving member 3. The cogs 4 are reduced in thickness, as shown, to enable the outer end of the dog to pass freely between them and the guiding lugs 6. These cogs 4 are reduced in width (height from plate) to make openings through which the operator may reach to adjust the tension of the spring 15. The large end of the lugs provides a broad abutment for the outer end of the dog as it springs into slot 5. The dog 20 being mounted in the cut-out portions 11 and 12 of the disk and flange 10 of the driven member 7, as described, rotates on its shaft 19 in a plane cutting the plane of said disk at right angles and has its inner or bottom side enlarged laterally to engage the inner edge of the flange 10 and thus limit its upward movement. Such upward movement may be limited by any suitable lugs or stops or other means. On the stud 23 is fulcrumed the lever 24 carrying the weight 25. The roller 26 is mounted on the axial shaft 27 set in said lever and held in place by the screws 27$^a$.

The operation of the clutch is as follows: The sprocket 2 being driven by a chain (not shown) rotates the driving clutch member 3 while the driven clutch member 7, with the dog shown in the position in Fig. 2, remains at rest, the roller 26 resting upon the upper side of the dog, and, assisted by the weight 25, depressing it against the pressure of the spring 15. The guiding lugs 6 on the clutch member 3, during the rotation of said clutch member, are carried over the extreme outer end 22$^c$ of the dog 20 as shown in dotted lines in Fig. 1. When the lever 14 is raised by power applied to the chain 28, the spring 15 raises the tooth 22$^b$ of the dog 20 against the inner side of one of the rotating cogs 4 along which it slides until it reaches and springs into one of the slots 5 thereby locking the two clutch members together and imparting motion to the gear 9 and thence by any suitable gearing to the machinery to be operated by the clutch. If, when the lever 24 is raised, the extreme outer end 22$^c$ of the dog is below one of the guiding lugs 6, it will come into contact therewith and slide along until coming to the end of the lug, when it will jump across into contact with the next cog, along which it will slide as just described. The purpose of these guiding lugs is to prevent the dog, when released by raising the lever, from jumping suddenly into, or just missing, one of the slots and thereby jarring and straining the machinery and wearing out the clutch. When the clutch members are locked together in rotation, the roller 26 will be in rolling contact with the flange of the driven clutch member and, if not held by the chain 28, will, after one revolution of the clutch, drop into the position shown in Fig. 2, thus releasing the driven member of the clutch. The chain 28 is adapted to be raised or lowered by a treadle, or any other suitable mechanism.

It is obvious that the members of the clutch will remain in engagement so long as the lever 24 is held by the chain 28 in the position shown in Fig. 1; and it is also obvious that, when the lever is released, the roller 26 will break the engagement automatically at the completion of one revolution by depressing the dog 20 as explained. This automatic feature is useful, when the clutch is employed in a machine to operate some reciprocating part, as, for example, to rotate radial arms a certain distance about their axes and then, releasing them automatically, permit them to drop back, an operation incident to hide working machines. The operator in any instance may at any time engage the members of the clutch by raising the chain 28, and then, by releasing the chain, leave the members to disengage themselves. If desirable, both the engagement and the release may be automatically arranged.

Having described my invention, what I claim and desire to secure by Letters Patent is—

In a clutch mechanism two members arranged upon a shaft, a driving clutch member with a slotted flange and guiding lugs and a driven clutch member with a dog pivoted thereto adapted to engage said slotted flange and said guiding lugs, with means for throwing said dog into and out of such engagement and maintaining such engagement; substantially as described.

In testimony whereof I have affixed my signature, in presence of two witnesses.

ROBERT F. WHITNEY.

Witnesses:
ELSIE M. COOLEDGE,
RALPH W. FOSTER.